US012050006B2

(12) United States Patent
Chen et al.

(10) Patent No.: US 12,050,006 B2
(45) Date of Patent: Jul. 30, 2024

(54) OPTIC WITH TOTAL INTERNAL REFLECTION REFRACTOR FOR BACK LIGHT CONTROL

(71) Applicant: ABL IP Holding LLC, Atlanta, GA (US)

(72) Inventors: Jie Chen, Snellville, GA (US); Qi Ai, Peachtree City, GA (US); Craig Eugene Marquardt, Covington, GA (US)

(73) Assignee: ABL IP Holding LLC, Atlanta, GA (US)

( * ) Notice: Subject to any disclaimer, the term of this patent is extended or adjusted under 35 U.S.C. 154(b) by 311 days.

(21) Appl. No.: 17/686,785

(22) Filed: Mar. 4, 2022

(65) Prior Publication Data

US 2023/0280014 A1 Sep. 7, 2023

(51) Int. Cl.
*F21V 7/00* (2006.01)
*F21V 7/09* (2006.01)

(52) U.S. Cl.
CPC .......... *F21V 7/0091* (2013.01); *F21V 7/0008* (2013.01); *F21V 7/09* (2013.01)

(58) Field of Classification Search
CPC ...... F21Y 2113/17; F21V 5/04; F21V 7/0091; F21V 13/04; F21V 5/08; F21V 7/04; F21V 7/09; F21V 7/00
See application file for complete search history.

(56) References Cited

U.S. PATENT DOCUMENTS 1,758,977 A * 5/1930 Rolph ...................... G02B 5/04 359/534
2,818,500 A 12/1957 Franck
3,278,743 A 10/1966 Franck
3,483,366 A 12/1969 Wince
4,282,022 A 8/1981 Lo et al.
(Continued)

FOREIGN PATENT DOCUMENTS

WO 2008003176 A1 1/2008

OTHER PUBLICATIONS

Jiang, "Optical Design of a Freeform TIR Lens for LED Streetlight," Optik—International Journal for Light and Electron Optics, vol. 121, No. 19, Oct. 2010, 5 pages.
(Continued)

*Primary Examiner* — William J Carter
(74) *Attorney, Agent, or Firm* — Kilpatrick Townsend & Stockton LL.P

(57) ABSTRACT

An optic having a first optic portion located on a first side of the optic and a second optic portion formed integrally with the first optic portion and located on a second side of the optic. A first cavity is defined by a first cavity inner surface in the first optic portion, the first optic portion being configured to refract light rays emitted by at least one light source. The second optic portion includes at least one total internal reflection surface and a second cavity defined at least partially by a second cavity rear surface that extends at an angle between 20° and 60°, inclusive, relative to an axis defining the height the of the optic. The second cavity rear surface is configured to refract other light rays toward the at least one total internal reflection surface, and the at least one internal reflection surface is configured to reflect the light rays toward the first side of the optic.

18 Claims, 11 Drawing Sheets

(56) References Cited

U.S. PATENT DOCUMENTS

| | | | | |
|---|---|---|---|---|
| 4,360,863 | A | 11/1982 | Barnes et al. | |
| 4,789,923 | A | 12/1988 | Sales | |
| 5,363,469 | A | 11/1994 | Elderfield | |
| 5,404,869 | A | 4/1995 | Parkyn, Jr. et al. | |
| 5,481,445 | A | 1/1996 | Sitzema et al. | |
| D397,479 | S | 8/1998 | Compton et al. | |
| 5,926,320 | A | 7/1999 | Parkyn et al. | |
| 6,547,423 | B2 | 4/2003 | Marshall et al. | |
| 6,549,332 | B2 | 4/2003 | Kimura | |
| 6,971,772 | B1 | 12/2005 | Abdelsamed et al. | |
| 7,411,742 | B1 | 8/2008 | Kim et al. | |
| 7,438,444 | B2 * | 10/2008 | Pao | G02B 19/0071 362/337 |
| 7,553,051 | B2 | 6/2009 | Brass et al. | |
| 7,580,192 | B1 | 8/2009 | Chu et al. | |
| 7,674,018 | B2 * | 3/2010 | Holder | F21V 29/70 362/311.06 |
| D618,384 | S | 6/2010 | Chen et al. | |
| D619,633 | S | 7/2010 | Chen et al. | |
| 7,772,988 | B1 | 8/2010 | Condon et al. | |
| D623,212 | S | 9/2010 | Chen et al. | |
| 7,828,456 | B2 | 11/2010 | Boyer et al. | |
| 7,878,695 | B2 | 2/2011 | Ishida | |
| D636,111 | S | 4/2011 | Chen et al. | |
| 7,942,559 | B2 | 5/2011 | Holder et al. | |
| 7,993,036 | B2 | 8/2011 | Holder et al. | |
| 8,016,451 | B2 | 9/2011 | Householder et al. | |
| 8,016,455 | B2 | 9/2011 | Paulussen | |
| D650,407 | S | 12/2011 | Chang et al. | |
| 8,182,110 | B2 | 5/2012 | Jiang et al. | |
| 8,210,722 | B2 | 7/2012 | Holder et al. | |
| 8,220,958 | B2 | 7/2012 | Montagne | |
| 8,322,864 | B2 | 12/2012 | Maes | |
| 8,330,342 | B2 | 12/2012 | Bhairi | |
| 8,331,037 | B2 | 12/2012 | Lu et al. | |
| 8,414,161 | B2 | 4/2013 | Holder et al. | |
| 8,419,214 | B2 | 4/2013 | Rizkin et al. | |
| 8,419,231 | B2 | 4/2013 | Anderson | |
| 8,434,912 | B2 * | 5/2013 | Holder | F21K 9/69 362/245 |
| 8,449,150 | B2 | 5/2013 | Allen et al. | |
| 8,469,552 | B2 | 6/2013 | Moeller | |
| 8,511,864 | B2 | 8/2013 | Holder et al. | |
| 8,905,597 | B2 | 12/2014 | Holder et al. | |
| 9,052,086 | B2 | 6/2015 | Broughton | |
| 9,140,430 | B2 | 9/2015 | Broughton | |
| 9,200,765 | B1 * | 12/2015 | Broughton | F21V 7/0091 |
| 9,297,520 | B2 | 3/2016 | Holder et al. | |
| 9,388,949 | B2 | 7/2016 | Holder et al. | |
| 9,435,510 | B2 | 9/2016 | Broughton | |
| 9,458,983 | B2 | 10/2016 | Broughton | |
| 9,494,283 | B2 | 11/2016 | Broughton | |
| 9,574,746 | B2 | 2/2017 | Broughton | |
| 9,816,672 | B1 | 11/2017 | Broughton | |
| D807,569 | S | 1/2018 | Marcoux et al. | |
| 10,006,606 | B2 | 6/2018 | Broughton | |
| 10,174,908 | B2 | 1/2019 | Holder et al. | |
| 10,222,027 | B2 | 3/2019 | Broughton | |
| D970,091 | S | 11/2022 | Siuvatti | |
| 2008/0012034 | A1 | 1/2008 | Thielen et al. | |
| 2010/0073927 | A1 | 3/2010 | Lewin et al. | |
| 2011/0075418 | A1 * | 3/2011 | Mallory | F21V 5/08 362/326 |
| 2011/0203662 | A1 * | 8/2011 | Minano | G02B 17/008 359/641 |
| 2011/0216537 | A1 | 9/2011 | Holder et al. | |
| 2011/0216543 | A1 | 9/2011 | Kayanuma | |
| 2012/0120666 | A1 | 5/2012 | Moeller | |
| 2012/0195040 | A1 | 8/2012 | Treanton | |
| 2012/0300488 | A1 | 11/2012 | Broughton | |
| 2014/0085905 | A1 | 3/2014 | Broughton | |
| 2016/0131332 | A1 | 5/2016 | Broughton | |
| 2016/0356451 | A1 | 12/2016 | Lin et al. | |
| 2017/0138569 | A1 | 5/2017 | Broughton | |
| 2019/0137074 | A1 | 5/2019 | Holder et al. | |
| 2019/0203910 | A1 | 7/2019 | Broughton | |
| 2023/0213169 | A1 | 7/2023 | He et al. | |

OTHER PUBLICATIONS

Wang et al., "Freeform LED Lens for Rectangularly Prescribed Illumination," Journal of Optics A Pure and Applied Optics, vol. 11, No. 10, Aug. 2009, 10 pages.

Wright et al., "SSL Luminaires Must Deliver Reliable Beam Patterns in Outdoor Applications," Sep. 2010, 8 pages.

The Acuity Optic illustrates the cross-sectional geometry of an optic incorporated in Acuity light fixtures at least as early as 2015.

"Autobahn Series ATB2, ATB0 and ATB Micro," LED Roadway Lighting, American Electric Lightening, 2021, 8 pages.

"D-Series LED, Size 0," Area Luminaire, Lithonia Lighting, 2017, 2 pages.

"DSXPG D-Series LED Parking Garage Luminaire," Lithonia Lighting, 2016, 2 pages.

"D-Series LED," Lithonia Lighting, Acuity Brands, 2016, 4 pages.

"D-Series LED," Brochure, Lithonia Lighting, Acuity Brands, 2017, 4 pages.

* cited by examiner

OPTIC WITH TOTAL INTERNAL REFLECTION REFRACTOR FOR BACK LIGHT CONTROL

FIELD OF INVENTION

The present technology relates to light fixtures, and more particularly to optics for light fixtures that include total internal reflection refractors to control the directionality of light emitted from the light fixtures.

DESCRIPTION OF THE RELATED ART

Outdoor light fixtures are used in residential and commercial locations and may be used for various illumination purposes including illuminating streets, sidewalks, and parking lots. Outdoor light fixtures are often desirable because they provide illumination at night to thereby increase visibility and safety.

Light sources in the outdoor light fixtures may generate and transmit light in multiple directions, some of which are undesirable. For example, light fixtures intended to light a sidewalk and/or street may also emit light towards residences located behind the light fixtures, which can be a nuisance to the inhabitants. This also leads to inefficiencies as all of the light from the light fixture is not being directed towards its intended target.

Large external reflectors positioned adjacent the light fixtures, or the light sources in the light fixtures, have been used to redirect emitted light in the desired direction. Moreover, small internal reflectors have been positioned within the primary optic. Both of these solutions lower the overall optical efficiency of the fixture and increase cost and installation time. Accordingly, there is a need to better and more accurately control the direction of light emitted by the light fixtures without increasing the cost of such fixtures.

BRIEF SUMMARY

The terms “invention,” “the invention,” “this invention” and “the present invention” used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Some embodiments are directed to an optic having a first optic portion located on a first side of the optic and a second optic portion formed integrally with the first optic portion and located on a second side of the optic. A first cavity is defined by a first cavity inner surface in the first optic portion, the first optic portion being configured to refract light rays emitted by at least one light source. The second optic portion includes at least one total internal reflection surface and a second cavity defined at least partially by a second cavity rear surface that extends at an angle between 20 and 60, inclusive, relative to an axis defining the height of the optic. The second cavity rear surface is configured to refract other light rays toward the at least one total internal reflection surface, and the at least one internal reflection surface is configured to reflect the light rays toward the first side of the optic.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Embodiments of the present invention are directed to an optic having incorporated within and formed integrally with it a total internal reflection refractor to redirect the light emitted in an undesirable direction toward a desirable direction. FIGS. 1-5 show one embodiment of an optic 100 that has a length L measured along an axis x, a width W is measured along an axis y, and a height H is measured along an axis z. The optic 100 includes a first optic portion 102 and a second optic portion 104. In some embodiments, the first optic portion 102 and the second optic portion 104 are formed integrally, such as via molding (e.g., injection molding). In other embodiments, the first optic portion 102 and the second optic portion 104 are formed separately and adhered or otherwise attached together to form the optic 100. The optic 100 can be formed of any optical grade polymeric material, including, but not limited to, silicone, poly (methyl methacrylate) (PMMA), polycarbonate, etc.

Figure 10:
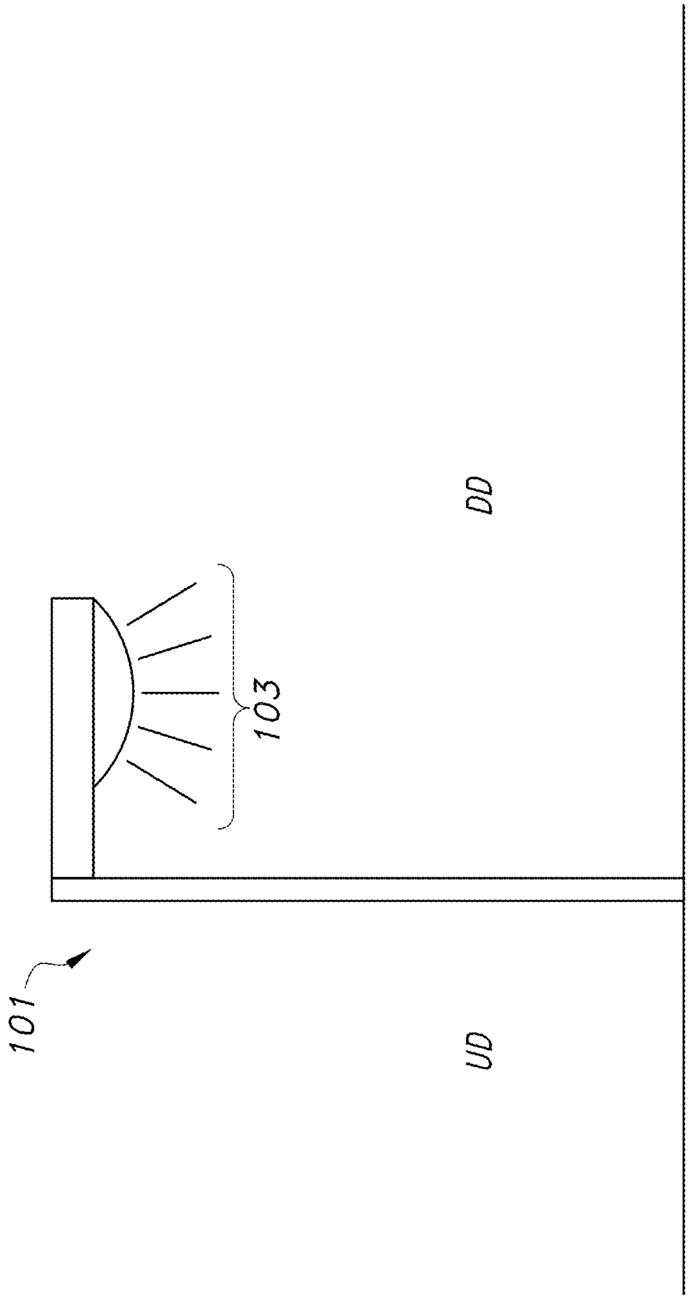
FIG. 10 is a schematic view of a light fixture with embodiments of the optic of FIG. 1 according to some embodiments.

In some embodiments, the first optic portion 102 is a refractor and the second optic portion 104 is a total internal reflection ("TIR") refractor. In use, the optic 100 is positioned over one or more light sources provided within a light fixture 101 (such as shown in FIG. 10) to direct the light 103 emitted from the light fixture 101. In one specific, non-limiting embodiment, the light fixture 101 is a pole-mounted fixture positioned outdoors to direct light toward a target area (e.g., sidewalk, parking lot, street, etc.). The optic 100 may be used to redirect light emitted by the light source(s) within the light fixture 101 in an undesirable direction UD back in a desirable direction DD toward the direction of the target area. In some embodiments, the first optic portion 102 is located on a first side of the optic 100 and positioned within the light fixture more proximate the target area than the second optic portion 104 that is located on a second side of the optic 100. The first optic portion 102 is designed to refract and emit light toward the target area (i.e., in the desirable DD). The second optic portion 104 is designed to reflect and refract light that is initially emitted from the light source(s) in the undesirable direction UD (i.e., away from the target area) back in the desirable direction DD (i.e., toward the target area). In some, non-limiting embodiments, the first optic portion 102 is oriented within the light fixture 101 more proximate the street side of an installation (a target area in some embodiments) and the second optic portion 104 is oriented more proximate a house side of the installation.

The first optic portion 102 is formed of a solid optical body defined by a first optic portion outer surface 106 and a first optic portion base surface 108. A first cavity 110 is defined in the underside of the first optic portion 102 by a first cavity inner surface 112. In some embodiments, the first cavity 110 can assume a semi-spherical shape or can have other curved shapes such as, but not limited to, a parabolic shape. In use, the optic 100 is positioned over one or more light sources such that the light sources are received within, and/or emit light into, the first cavity 110. While the first optic portion 102 of the optic 100 is illustrated as having a substantially smooth, curved outer shape defined by the first optic portion outer surface 106, the first optic portion 102 may include any desirable cross-sectional outer shape, including, but not limited to, a square shape, a rectangular shape, a triangular shape, a circular shape, and the like.

In some embodiments, the first optic portion 102 acts as a refractor to receive light emitted from the light source(s) in a first direction and emit light from the first optic portion 102 in a second direction that is the same or similar to the first direction. More specifically, at least some of the light rays emitted from the light source(s) impinge on, and are bent at a first bending angle by, the first cavity inner surface 112, pass through the first optic portion 102, and are further bent at a second bending angle by, and exit through, the first optic portion outer surface 106. For purposes of this application, "bending angle" refers to the angle between the paths of a light ray entering and exiting an optic surface. The first and second bending angles can be the same or different. In some embodiments, the light rays received by the first optic portion 102 may include light rays originally emitted in a desirable direction DD. In some embodiments, such light rays are refracted and exit the first optic portion 102 also in the desirable direction DD.

The second optic portion 104 is a solid optical body defined by a second optic portion base surface 114, opposing second optic portion outer side surfaces 116*a*, 116*b*, a second optic portion outer front surface (or surfaces) 118 and a second optic portion outer rear surface 120. "Front" and "rear" are intended to reference proximity to the first optic portion 102, such that a second optic portion outer front surface 118 is more proximate the first optic portion 102 than the second optic portion outer rear surface 120. In some embodiments, first and second optic base surfaces 108, 114 are co-planar; however, such may not always be the case. Moreover, in some embodiments, the second optic portion outer front surface 118 extends substantially perpendicular relative to one or both of the first and second optic base surfaces 108, 114. Furthermore, in some embodiments, the second optic portion side surfaces 116*a*, 116*b* extend substantially parallel to each other and/or substantially perpendicular to the second optic portion outer front surface 118 and/or substantially perpendicular to one or both of the first and second optic base surfaces 108, 114. The second optic portion outer rear surface 120 curves concavely relative to one or more light source(s) emitting light into the optic 100. One of skill in the art will understand that the outer shape of the second optic portion 104 may deviate from what is illustrated.

Figure 1:
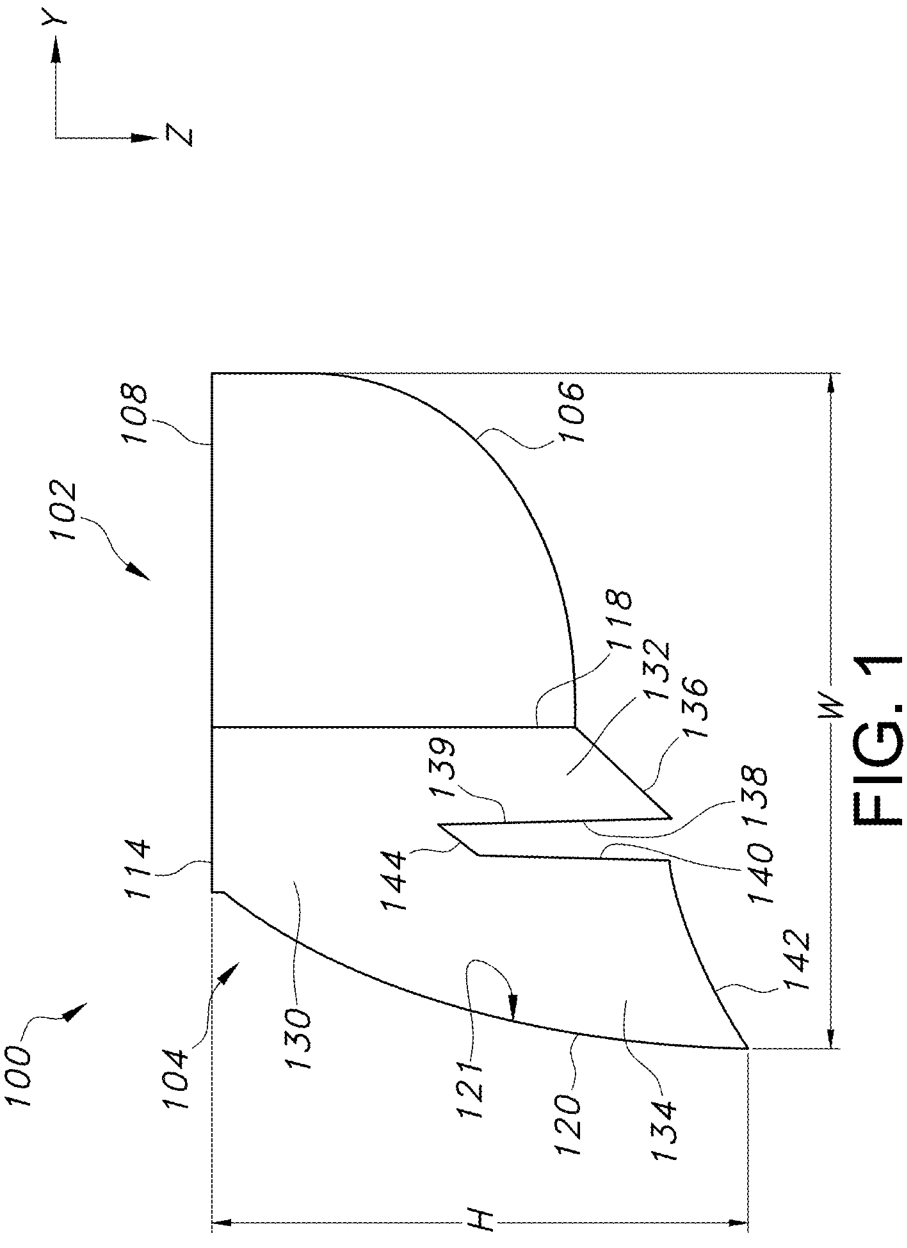
FIG. 1 is a side elevation view of an embodiment of an optic for a light fixture.
Figure 2:
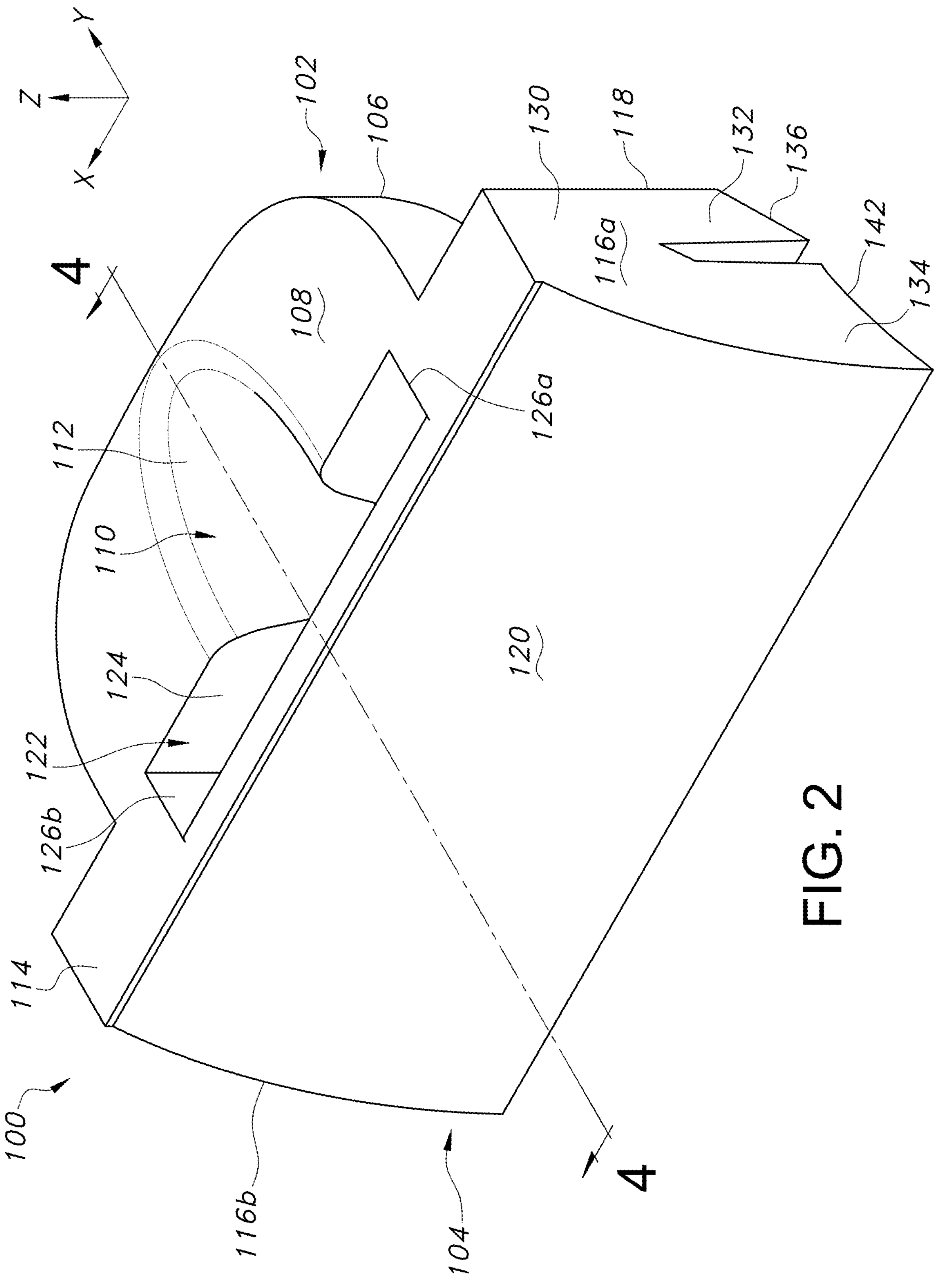
FIG. 2 is a top perspective view of the optic of FIG. 1.
Figure 3:
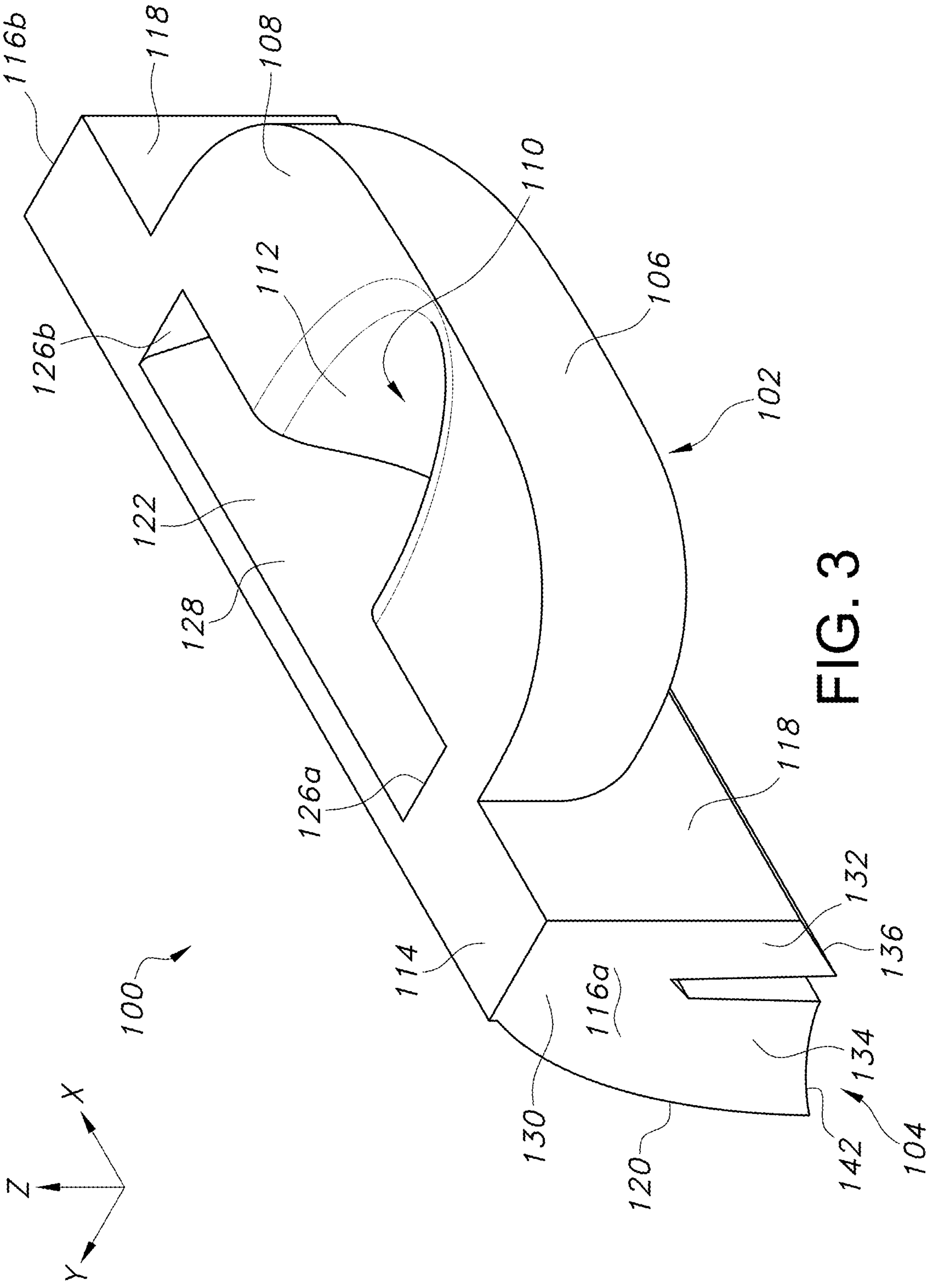
FIG. 3 is another top perspective view of the optic of FIG. 1.
Figure 4:
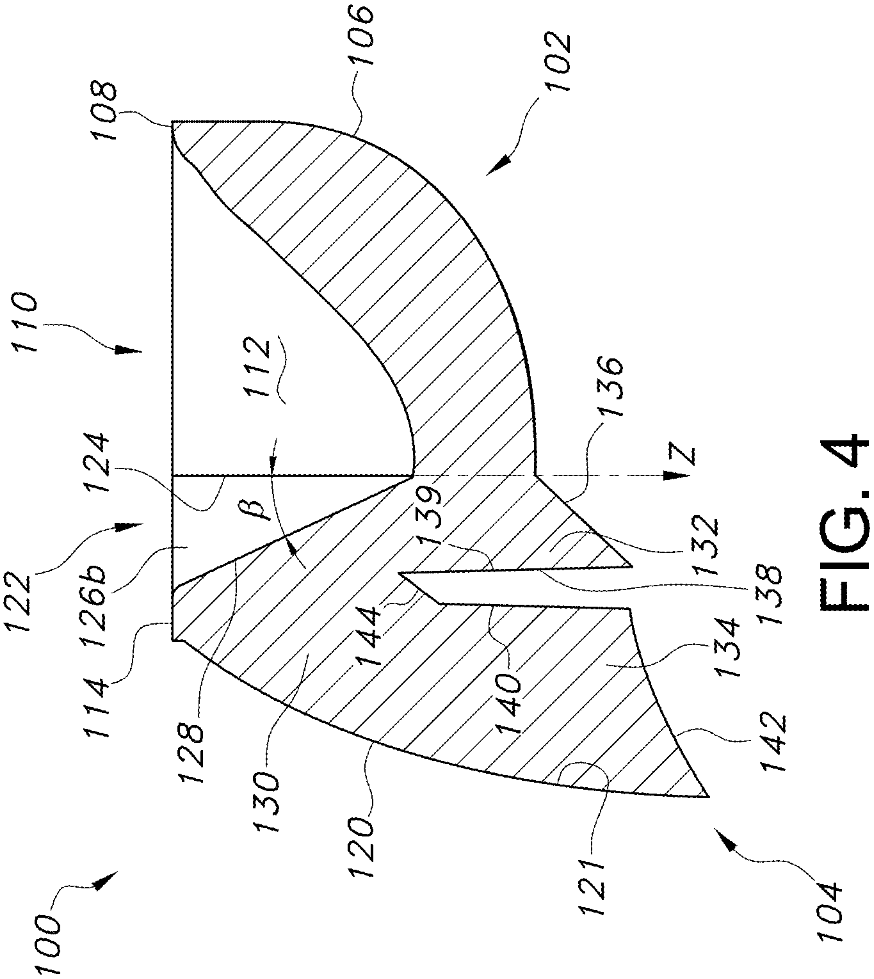
FIG. 4 is a cross-section of the optic of FIG. 1 taken along line 4-4 in FIG. 2.
Figure 5:
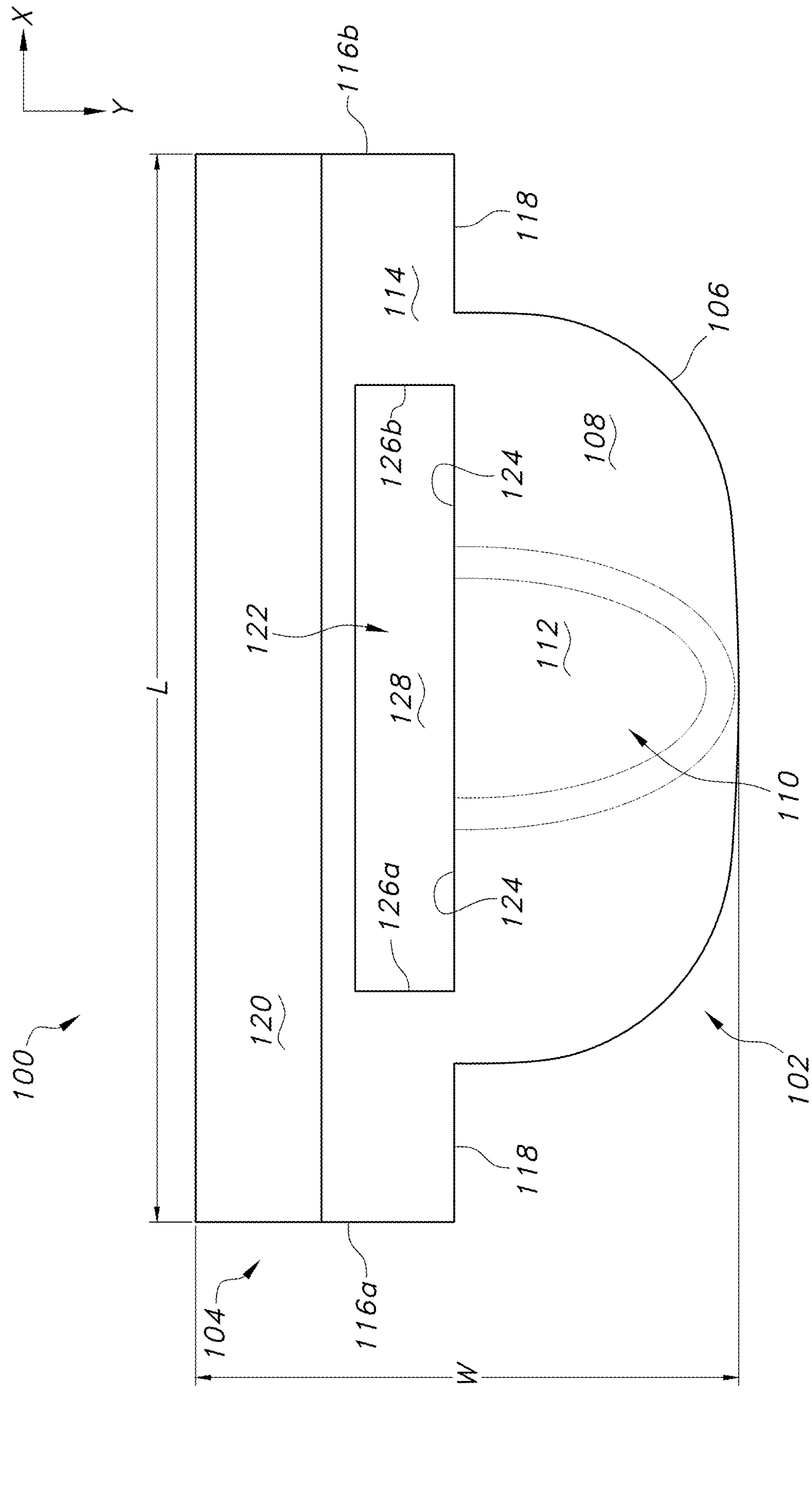
FIG. 5 is a top plan view of the optic of FIG. 1.

A second cavity 122 is formed in the underside of the second optic portion 104 and connects and is in communication with the first cavity 110. As best seen in FIG. 5, the opening of the first cavity 110 defined in the first optic portion base surface 108 is substantially semi-ellipsoidal in shape, and the opening of the second cavity 122 defined in the second optic portion base surface 114 is substantially rectangular in shape. Note, however, that one or both of the openings could be other shapes.

The second cavity 122 is defined by a second cavity front surface (or surfaces) 124, opposing second cavity side surfaces 126*a*, 126*b*, and a second cavity rear surface 128 that extends between the second cavity side surfaces 126*a*, 126*b*. In some embodiments, the second cavity front surface 124 extends substantially perpendicular relative to one or both of the first and second optic base surfaces 108, 114. Furthermore, in some embodiments, the second cavity side surfaces 126*a*, 126*b* extend substantially parallel to each other and/or substantially perpendicular to the second cavity front surface 124 and/or substantially perpendicular to one or both of the first and second optic base surfaces 108, 114. In some embodiments, the second cavity rear surface 128 extends from the second optic base surface 114 toward and/or to the second cavity front surface 124. In some embodiments, the second cavity rear surface 128 extends at an angle θ relative to axis z (the axis along which height H is measured). In some embodiments, axis z is parallel to nadir. In some embodiments, axis z is perpendicular to one or both of first optic portion base surface 108 and second optic base surface 114. In some embodiments, angle β is between 10°-70°, inclusive; between 20°-60°, inclusive; between 30°-50°, inclusive; between 25°-45°, inclusive; between 25°-35°, inclusive; and/or between 20°-30°, inclusive. In some embodiments, angle β is constant along all or substantially all of the height of the second cavity rear surface 128 (i.e., the second cavity rear surface 128 is flat/planar or substantially flat/planar). Some or all of the surfaces described herein can be smooth or can be provided with surface enhancements depending on the desired light output.

The second optic portion 104 includes a refractor base 130 from which extends a first TIR refractor portion 132 and a second TIR refractor portion 134 (more distal the first optic portion 102 than the first TIR refractor portion 132). The first TIR refractor portion 132 include a first TIR refractor portion exit surface 136 and a first TIR refractor portion rear surface 138 having an internal reflection surface 139. The second TIR refractor portion 134 includes a second TIR refractor portion front surface 140 and a second TIR refractor portion exit surface 142. The second optic portion outer rear surface 120 defines the rear of the second TIR refractor portion 134 and has an internal reflection surface 121. The first TIR refractor portion rear surface 138 and the second TIR refractor portion front surface 140 are illustrated as extending substantially parallel to each other and as being connected by a connecting surface 144 such that a trough is essentially formed between the first and second TIR refractor portions 132, 134. Moreover, the first TIR refractor portion top surface 136 is illustrated as being flat and extending at a constant angle upwardly from the first optic portion 102, and the second TIR refractor portion exit surface 142 is illustrated as curving concavely into the optic 100. However, one of skill in the art will understand that the geometry of the second optic portion 104 may be modified and customized as desired. By way only of example, the second optic portion 104 may only have a single TIR refractor portion or may have more than two TIR refractor portions. Moreover, the angulation and/or curvature of the surfaces may be modified to achieve a particular light output. Thus, in no way should the geometry of the second option portion 104 (or the first optic portion 102) shown in the figures be limiting on embodiments of the present invention.

Figure 6:
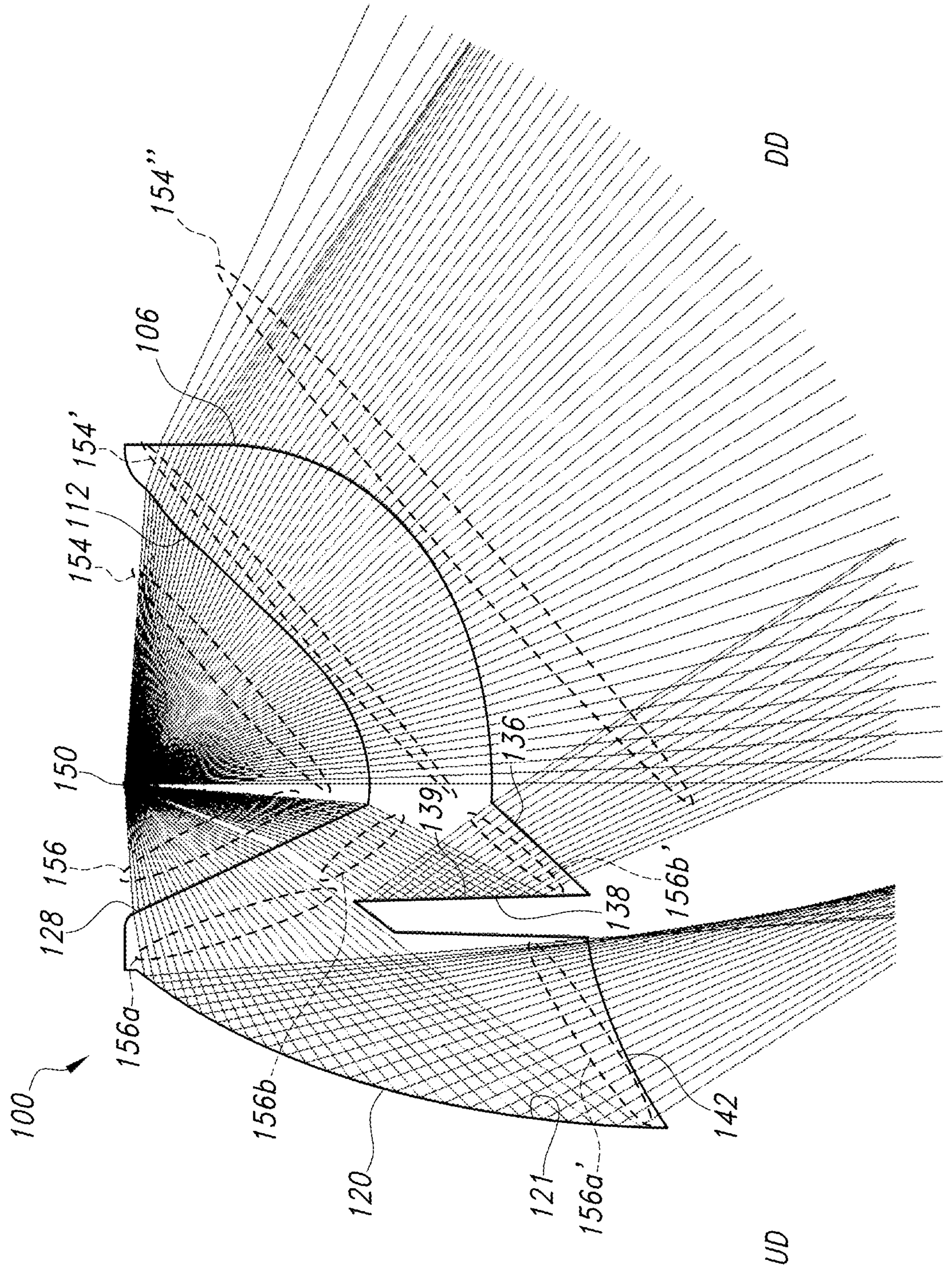
FIG. 6 is a schematic 2D ray trace diagram illustrating light rays passing through the optic of FIG. 1.
Figure 7:
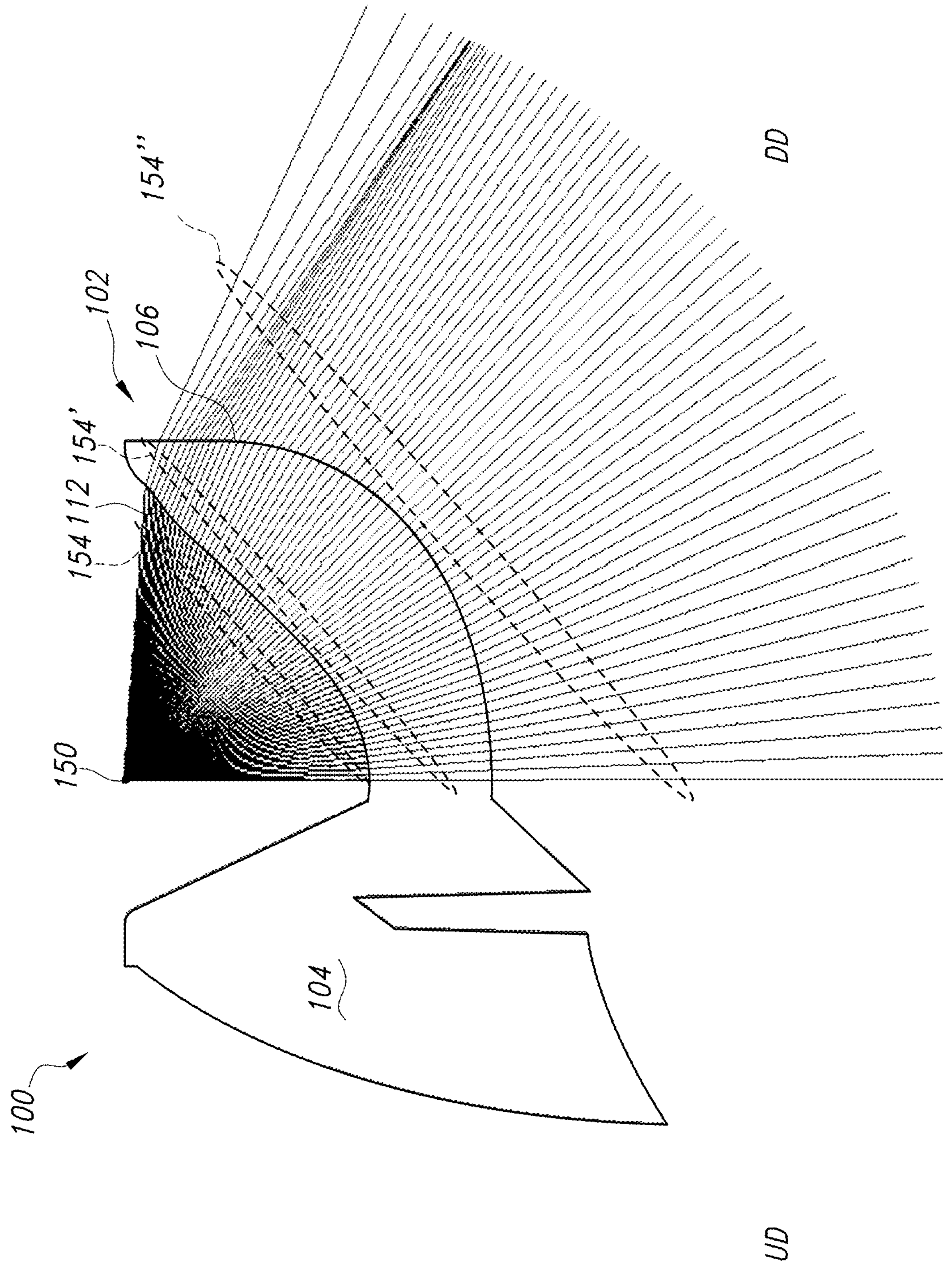
FIG. 7 is a schematic 2D ray trace diagram illustrating light rays passing through a first portion of the optic of FIG. 1.
Figure 8:
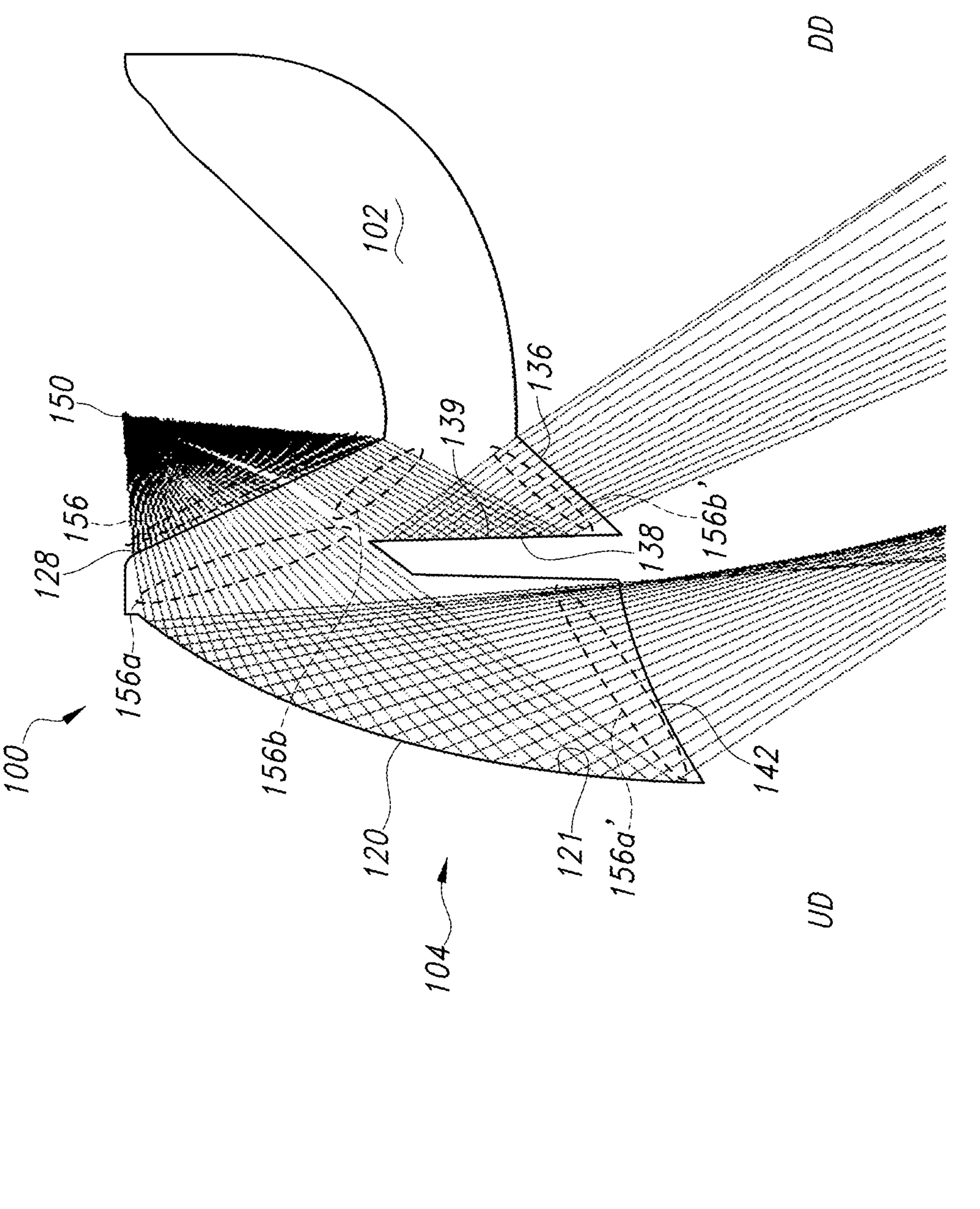
FIG. 8 is a schematic 2D ray trace diagram illustrating light rays passing through a second portion of the optic of FIG. 1.

In use and as seen in FIGS. 6-8, the optic 100 is positioned within a light fixture over one or more light sources 150 such that the one or more light sources 150 emit light within the first and second cavities 110, 122. In some embodiments, the optic 100 is mounted within the light fixture by attaching the first and second optic base surfaces 108, 114 to a component of the light fixture. In some non-limiting embodiments, the light fixture is an outdoor light fixture, such as, but not limited to, a street light, a floodlight, and the like. Moreover, the light source(s) 150 can include any suitable source of light. For example, the light source(s) 150 can include an LED, an OLED, an incandescent bulb, and the like.

In use, a light source 150 generates emitted light that passes through the optic 100. In some embodiments, the first optic portion 102 acts as a refractor and the second optic portion 104 acts as a TIR refractor to redirect and reflect some of the light that is emitted in an undesirable direction UD back in a desirable direction DD.

FIGS. 6-8 are ray trace diagrams illustrating performance of optic 100. More specifically and as shown in FIGS. 6 and 7, first light rays 154 are generally emitted from a light source 150 toward the desirable direction DD and pass through and/or are refracted by the first optic portion 102 so as to leave the optic 100 in the desirable direction DD. In some embodiments, the first light rays 154 are incident on the first cavity inner surface 112 in an entrance direction, and at least some of the first light rays 154 are refracted into the first optic portion 102 at an entrance bending angle to form refracted first light rays 154'. Upon passing out of the first optic portion 102 through the first optic portion outer surface 106, at least some of the refracted first light rays 154' are again refracted at an exit bending angle to form output first light rays 154" that exit the optic in an exit direction. In some embodiments, the angle between the entrance direction and the exit direction of the first light rays 154 is between 0°-45°, inclusive. In some embodiments, the angle between the entrance direction and the exit direction of at least some of the first light rays 154 is greater than 0° and up to 45°, inclusive. The optic 100 can be designed to realize the entrance and exit bending angles necessary to achieve this desired angle. The first and second bending angles can be the same or different for light rays of the first light rays 154. Regardless, the majority or all of the output first light rays 154" exit the optic 100 toward the desirable direction DD in some embodiments.

As best seen in FIGS. 6 and 8, second light rays 156 are generally emitted from the light source 150 toward the undesirable direction DD and are reflected and refracted by the second optic portion 104 so as to leave the optic 100 in a direction toward the desirable direction DD. In some embodiments, the second light rays 156 are incident on the second cavity rear surface 128 and refracted into the second optic portion 104 at an entrance bending angle. The entrance bending angle of at least some of the second light rays 156 refracts them towards one of the internal reflection surface 139 of the first TIR refractor portion rear surface 138 or the internal reflection surface 121 of the second optic portion outer rear surface 120. In the illustrated embodiment, a first set of refracted second light rays **156*a* are refracted toward the internal reflection surface 121 and a second set of refracted second light rays 156*b* are refracted toward the internal reflection surface 139. In some embodiments, the entrance bending angle range of at least some of the second light rays 156 is between 1°-25°. In the illustrated embodiments, the entrance bending angles of the first set of refracted second light rays 156*a* are generally smaller than the entrance bending angles of the second set of refracted second light rays 156*b*, but such may not always be the case. Moreover, in some embodiments the entrance bending angles of the second light rays 156 increase along the height of the second cavity rear surface 128 in a direction from the second optic portion base surface 114 toward the first optic portion 102. The angled, flat nature of the second cavity rear surface 128** has been found to improve light bending over cavities defined by concavely curved walls.

The first set of refracted second light rays **156*a* are reflected as a first set of reflected second light rays 156*a*' by the internal reflection surface 121 in a direction towards the second TIR refractor portion exit surface 142. The first set of reflected second light rays 156*a*' are then refracted by the second TIR refractor portion exit surface 142 and exit the optic 100 in a direction toward the desirable direction DD. Similarly, the second set of refracted second light rays 156*b* are reflected as a second set of reflected second light rays 156*b*' by the internal reflection surface 139 in a direction towards the first TIR refractor portion exit surface 136. The second set of reflected second light rays 156*b*' are then refracted by the first TIR refractor portion exit surface 136 and exit the optic 100 in a direction toward the desirable direction DD. Another way to state this is that the first option portion 102 is on a first side of the optic 100 and the second optic portion 104 is on a second side of the optic 100, and the second optic portion 104 is designed to redirect light emitted toward the second side of the optic 100 toward the first side of the optic 100**.

Figure 9:
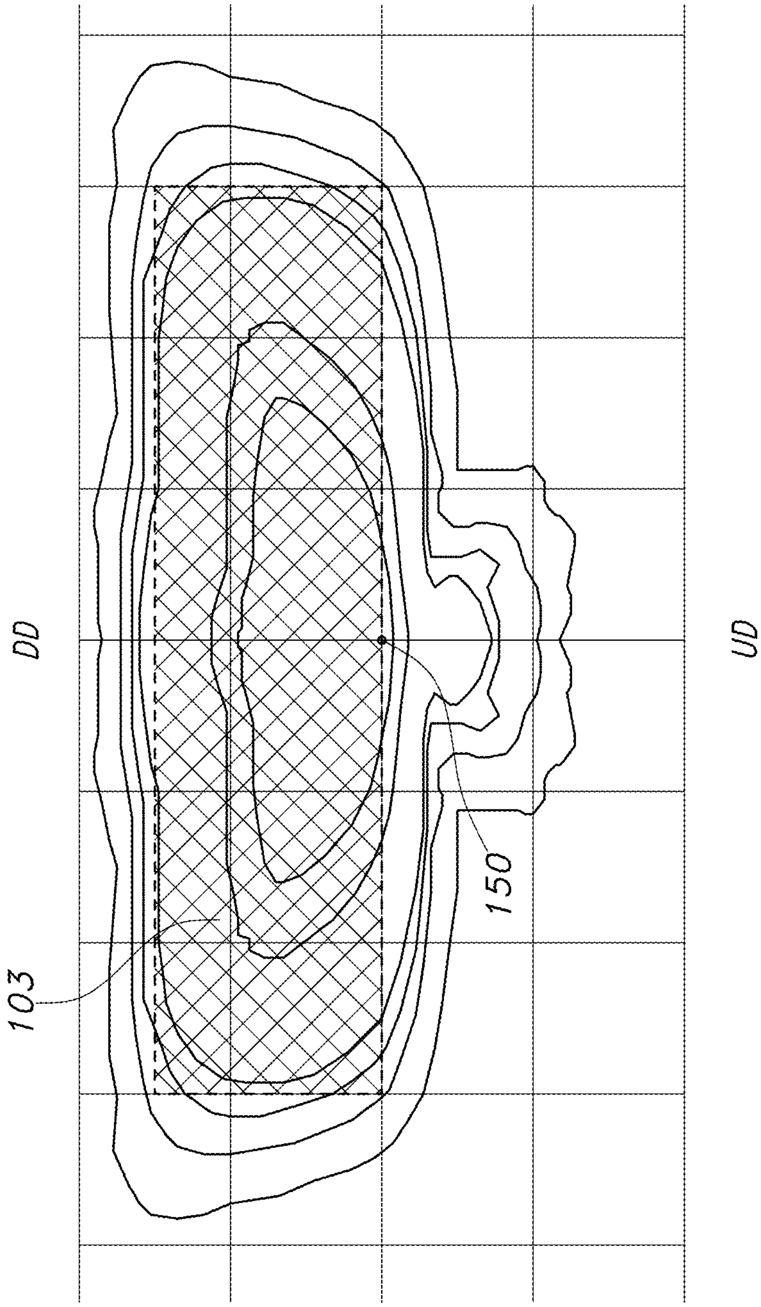
FIG. 9 is a polar plot showing the distribution of light created when a light source emits light that is redirected by the optic of FIG. 1.

FIG. 9 is a polar plot of an intensity distribution created when light source(s) emit light that is redirected by optic 100, as illustrated in FIGS. 6-8. It is apparent that the optic 100 directs the vast majority of emitted light 103 in the desirable direction DD. More specifically, only approximately 12-13% of the light emitted from the light fixture is directed in the undesirable direction UD, meaning that the vast majority of light is converted to forward light directed in the desirable direction DD toward the target area. This results in an optical efficiency that exceeds 95%. Moreover, the optic 100 is able to control back lighting without the use of external shields or reflectors.

Figure 11:
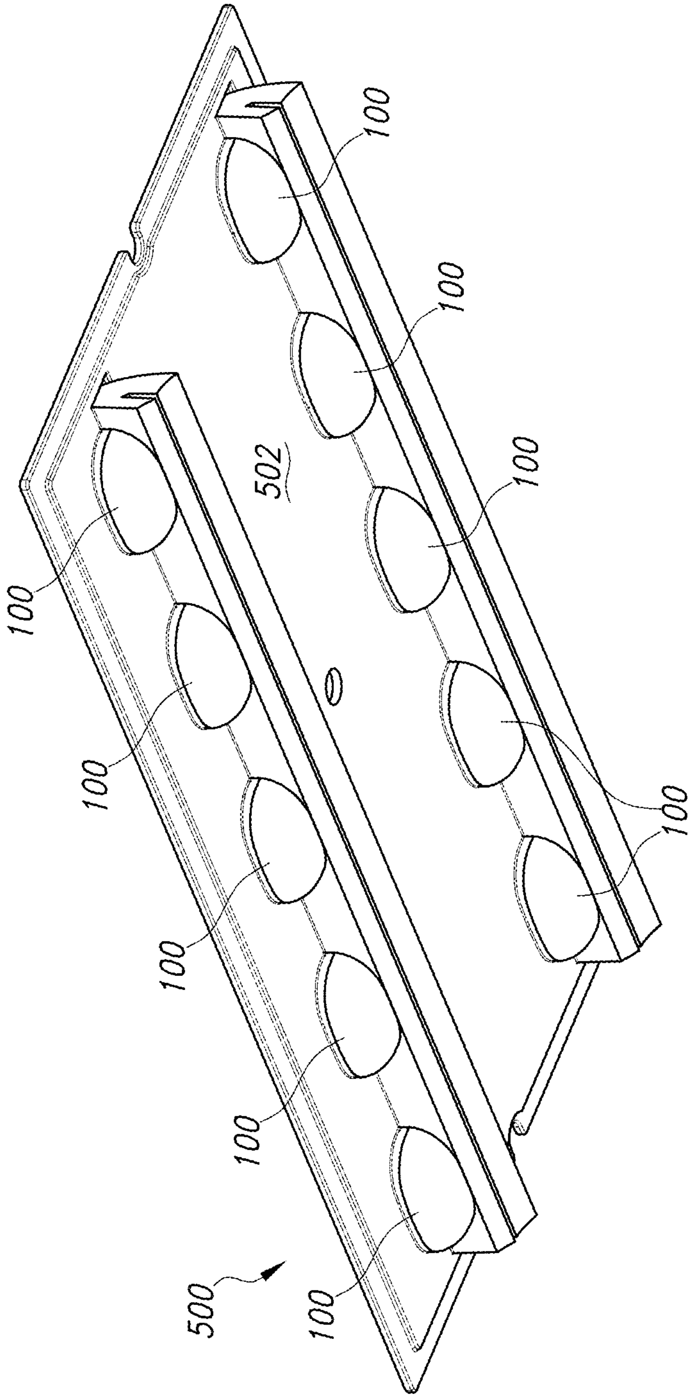
FIG. 11 is a perspective view of a plurality of the optics of FIG. 1 provided on a lens.

In some embodiments, a series of optics 100 may be provided on a lens 500 for use in a light fixture, as seen in FIG. 11. Any number of optics 100 may be provided on the lens 500 in any arrangement and orientation. In some embodiments, each optic 100 may be formed separately and secured to a lens substrate 502. In other embodiments, a row of optics 100 is integrally-formed and subsequently secured to the lens substrate 502. In still other embodiments, the optics 100 and lens substrate 502 are formed integrally with each other. Regardless, in use, the lens 500 is positioned over light sources such that at least one light source emits light into each of the optics 100, which direct the light as described above.

The various aspects, embodiments, implementations or features of the described embodiments can be used separately or in any combination. In particular, it should be appreciated that the various elements of concepts from FIGS. 1-3 may be combined without departing from the spirit or scope of the invention.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term “substantially” refers to the complete or nearly complete extent or degree of an action, characteristic, property, state, structure, item, or result. For example, an object that is “substantially” enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An optic having a base surface and a height measured from the base surface along an axis, the optic further comprising:

a first optic portion located on a first side of the optic and comprising a first optic portion outer surface and a first cavity defined in the base surface by a first cavity inner surface, wherein the first optic portion is configured to refract first light rays emitted by at least one light source; and a second optic portion formed integrally with the first optic portion and located on a second side of the optic, the second optic portion comprising at least one total internal reflection surface and a second cavity defined in the base surface at least partially by a second cavity rear surface extending from the base surface toward the first optic portion, wherein:

the second cavity rear surface extends at an angle between 20° and 60°, inclusive, relative to the axis;

the second cavity rear surface is configured to refract toward the at least one total internal reflection surface at bending angles within a bending angle range second light rays emitted by the at least one light source in an emitting direction that is away from the first side of the optic; and the at least one total internal reflection surface is configured to reflect toward the first side of the optic the second light rays refracted by the second cavity rear surface.

2. The optic of claim 1, wherein each of the first light rays enter the first optic portion in an entrance direction and exit the first optic outer surface in an exit direction that is not towards the second side of the optic, wherein the entrance direction and the exit direction are different for at least some of the first light rays such that an angle is formed between the entrance direction and the exit direction of each of the at least some first light rays.

3. The optic of claim 2, wherein the angle between the entrance direction and the exit direction is less than or equal to 45°.

4. The optic of claim 1, wherein the second cavity rear surface is substantially flat and extends at a constant angle from the base surface to the first optic portion.

5. The optic of claim 1, wherein the second cavity is further defined by a second cavity front surface and opposing second cavity side surfaces that extend between the second cavity front surface and the second cavity rear surface.

6. The optic of claim 1, wherein the second cavity comprises an opening in the base surface and wherein the opening is substantially rectangular-shaped.

7. The optic of claim 1, wherein the second optic portion further comprises a refractor exit surface positioned and configured to receive the second light rays reflected by the at least one total internal reflection surface and to refract the second lights rays out of the second optic portion in an exit direction toward the first side of the optic.

8. The optic of claim 1, wherein the bending angle range is between 1° to 25°, inclusive.

9. The optic of claim 1, wherein the at least one total internal reflection surface comprises a first total internal reflection surface and a second total internal reflection surface, wherein the second cavity rear surface is configured to refract toward the first total internal reflection surface a first portion of the second light rays and is configured to refract toward the second total internal reflection surface a second portion of the second light rays, wherein the first total internal reflection surface is configured to reflect toward the first side of the optic the first portion of the second light rays and wherein the second total internal reflection surface is configured to reflect toward the first side of the optic the second portion of the second light rays.

10. The optic of claim 9, wherein the second cavity rear surface refracts the first portion of the second light rays within a first bending angle range and refracts the second portion of the second light rays within a second bending angle range, wherein angles in the first bending angle range are smaller than angles in the second bending angle range.

11. The optic of claim 10, wherein the first portion of the second light rays are refracted at a location along a height of the second cavity rear surface that is more proximate the base surface than the second portion of the second light rays.

12. The optic of claim 9, wherein the second optic portion further comprises a first refractor exit surface and a second refractor exit surface, wherein the first refractor exit surface is positioned and configured to receive the first portion of the second light rays reflected by the first total internal reflection surface and to refract the first portion of the second lights rays out of the second optic portion toward the first side of the optic and wherein the second refractor exit surface is positioned and configured to receive the second portion of the second light rays reflected by the second total internal reflection surface and to refract the second portion of the second lights rays out of the second optic portion toward the first side of the optic.

13. A light fixture comprising the optic of claim 1.

14. An optic having a base surface, a height measured from the base surface along an axis, a first side, and an opposing second side, the optic further comprising:

a first optic portion located on the first side of the optic and comprising a first optic portion outer surface and a first cavity defined in the base surface by a first cavity inner surface, wherein the first optic portion is configured to refract first light rays emitted from at least one light source, wherein each of the first light rays enter the first optic portion in a first light ray entrance direction and exit the first optic outer surface in a first light ray exit direction that is not towards the second side of the optic, wherein the first light ray entrance direction and the first light ray exit direction are different for at least some of the first light rays such that a first light ray angle is formed between the first light ray entrance direction and the first light ray exit direction of each of the at least some first light rays; and a second optic portion formed integrally with the first optic portion and located on the second side of the optic, the second optic portion comprising a first total internal reflection surface, a second total internal reflection surface, a first refractor exit surface, a second refractor exit surface, and a second cavity defined in the base surface at least partially by a substantially flat second cavity rear surface extending from the base surface toward the first optic portion at a constant angle between 20° and 60°, inclusive, relative to the axis, wherein:

the substantially flat second cavity rear surface is configured to refract toward the first total internal reflection surface a first portion of second light rays emitted by the at least one light source in an emitting direction away from the first side of the optic and is configured to refract toward the second total internal reflection surface a second portion of the second light rays emitted by the at least one light source in the emitting direction away from the first side of the optic, wherein the first portion of the second light rays is more proximate the base surface than the second portion of the second light rays;

the first total internal reflection surface is configured to reflect toward the first side of the optic the first portion of the second light rays and wherein the second total internal reflection surface is configured to reflect toward the first side of the optic the second portion of the second light rays; and wherein the first refractor exit surface is positioned and configured to receive the first portion of the second light rays reflected by the first total internal reflection surface and to refract the first portion of the second lights rays out of the second optic portion toward the first side of the optic and wherein the second refractor exit surface is positioned and configured to receive the second portion of the second light rays reflected by the second total internal reflection surface and to refract the second portion of the second lights rays out of the second optic portion toward the first side of the optic.

15. The optic of claim 13, wherein the substantially flat second cavity rear surface refracts the first portion of the second light rays at first bending angles with a first bending angle range and refracts the second portion of the second light rays at second bending angles within a second bending angle range, wherein at least some of the first bending angles are smaller than the second bending angles.

16. The optic of claim 15, wherein the first portion of the second light rays are refracted at a location along a height of the substantially flat second cavity rear surface that is more proximate the base surface than the second portion of the second light rays.

17. The optic of claim 14, wherein the second cavity is further defined by a second cavity front surface and opposing second cavity side surfaces that extend between the second cavity front surface and the substantially flat second cavity rear surface.

18. The optic of claim 14, wherein the first light ray angle is greater than 0° and up to 45°, inclusive.

* * * * *